(12) United States Patent
Yuan

(10) Patent No.: US 7,570,442 B2
(45) Date of Patent: Aug. 4, 2009

(54) LENS MODULE AND METHOD FOR ASSEMBLING SAME

(75) Inventor: Kun-I Yuan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/946,328

(22) Filed: Nov. 28, 2007

(65) Prior Publication Data
US 2009/0002853 A1  Jan. 1, 2009

(30) Foreign Application Priority Data
Jun. 27, 2007  (CN)  ......... 2007 1 0200903

(51) Int. Cl.
*G02B 7/02* (2006.01)
(52) U.S. Cl. .......... 359/819; 359/821; 359/822
(58) Field of Classification Search ......... 359/694–703, 359/819–824
See application file for complete search history.

(56) References Cited

U.S. PATENT DOCUMENTS

| 5,765,048 A * | 6/1998 | Nomura et al. ......... 396/72 |
| 5,808,817 A * | 9/1998 | Miyamoto et al. ...... 359/819 |
| 2007/0121223 A1 | 5/2007 | Watanabe |

* cited by examiner

*Primary Examiner*—Mohammed Hasan
(74) *Attorney, Agent, or Firm*—Frank R. Niranjan

(57) ABSTRACT

A lens module includes: a lens barrel, a first lens, a second lens and a transparent adhesive layer. The first and second lenses are received in the lens barrel, and a clear aperture of the first lens is equal to and in alignment with that of the second lens. The transparent adhesive layer is applied between the first and second lenses in a manner such that the transparent adhesive layer spaces and joins the first and second lenses. A method for assembling the lens module is also provided.

8 Claims, 3 Drawing Sheets

LENS MODULE AND METHOD FOR ASSEMBLING SAME

BACKGROUND

1. Technical Field

The present invention relates to a lens module and a method for assembling the lens module.

2. Description of Related Art

With the ongoing development of microcircuitry and multimedia technology, camera modules, including, e.g., still camera modules and digital camera modules are now in widespread use and are being combined with various electronic devices. Such camera modules need to satisfy requirements of compactness, low cost and excellent optical performance.

A camera module of the related art includes at least one lens module and an image sensor in alignment with the at least one lens module. The at least one lens module typically includes a lens barrel and a number of lenses arranged in the lens barrel. Generally, spacers, which are impenetrable by light and in different thicknesses, are used for spacing the lenses, and the lenses are attached to the spacers by glue. However, in this way, a large number of the spacers are required as the number of the lenses increases, which makes it difficult for the lens module to be compact.

What is needed, therefore, is a lens module which uses less spacers and a method for assembling the lens module.

SUMMARY

In a present embodiment, an exemplary lens module includes: a lens barrel, a first lens, a second lens and a transparent adhesive layer. The first and second lenses are received in the lens barrel, and a clear aperture of the first lens is equal to and in alignment with that of the second lens. The transparent adhesive layer is arranged between the first and second lenses in a manner such that the transparent adhesive layer spaces and joins the first and second lenses.

In another present embodiment, an exemplary method for assembling a lens module includes steps of: providing a lens barrel, a first lens and a second lens, a clear aperture of the first lens being equal to that of the second lens; applying a transparent adhesive layer on a surface of the first lens; placing the second lens on the transparent adhesive layer and aligning the clear aperture of the first lens with that of the second lens thereby forming a lens group; and disposing the lens group into the lens barrel.

Other advantages and novel features of the present invention will become more apparent from the following detailed description of preferred embodiment when taken in conjunction with the accompanying drawings.

BRIEF DESCRIPTION OF THE DRAWINGS

Many aspects of the lens module and the method can be better understood with reference to the following drawings. The components in the drawing are not necessarily drawn to scale, the emphasis instead being placed upon clearly illustrating the principles of the present lens module and method. Moreover, in the drawings, like reference numerals designate corresponding parts throughout the several views.

DETAILED DESCRIPTION OF THE PREFERRED EMBODIMENTS

Embodiments of the present lens module and assembling method will now be described in detail below and with reference to the drawings.

Figure 1:
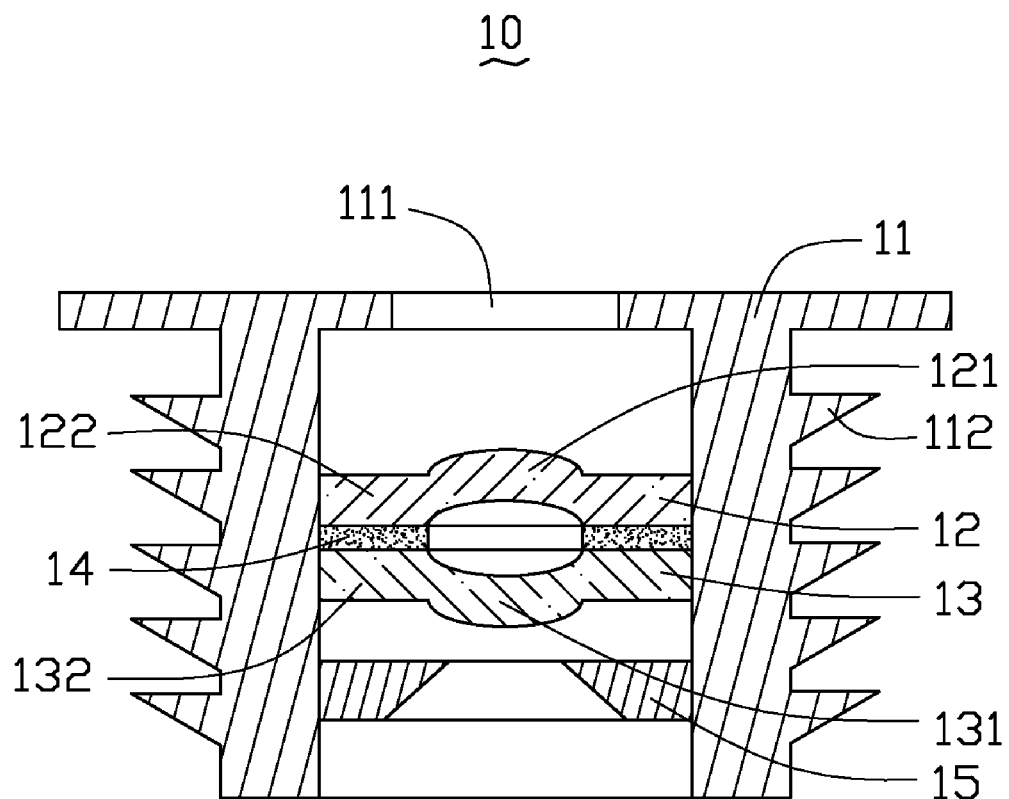
FIG. 1 is a schematic view of a lens module according to a first embodiment of the present invention.
Figure 2:
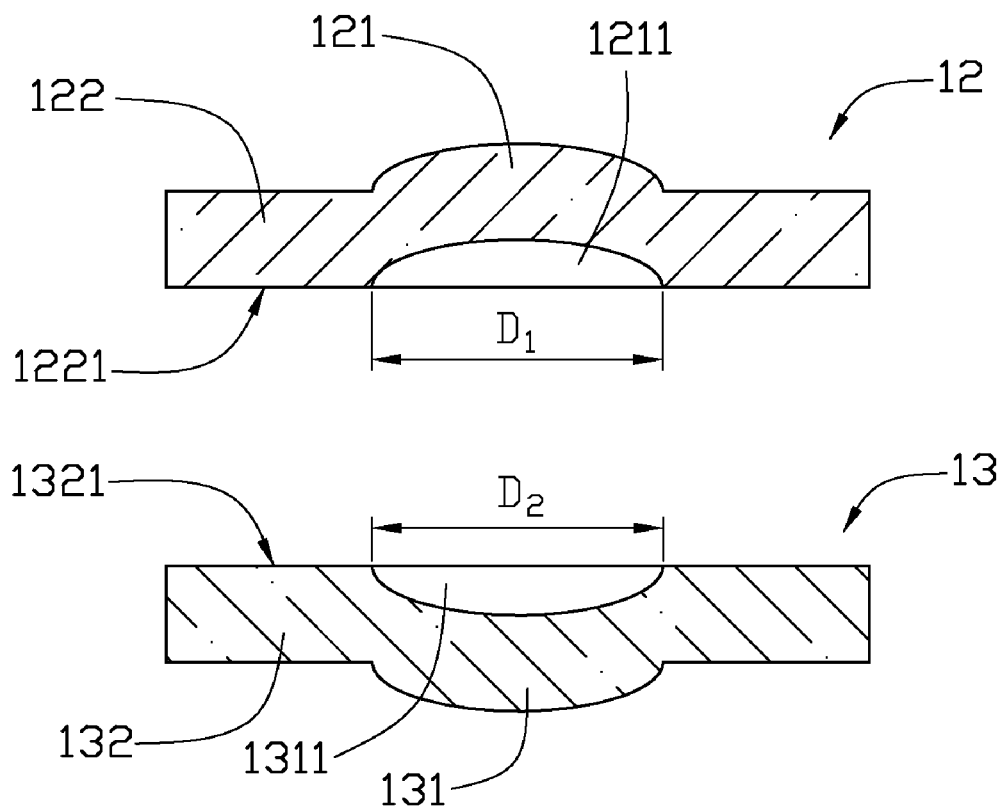
FIG. 2 is a schematic view of the first lens and the second lens shown in FIG. 1.

Referring to FIGS. 1 and 2, an exemplary lens module 10 according to a first embodiment is shown. The lens module 10 includes a lens barrel 11, a first lens 12, a second lens 13 and a transparent adhesive layer 14.

The lens barrel 11 is in a cylinder shape and has a light incident opening 111 at one end thereof. The lens barrel 11 has a plurality of threads 112 on an outer wall thereof, thus facilitating engagement with a holder (not shown) or a main body of an electronic device.

The first and second lens 12, 13 each can be made of plastic or glass, and in a spherical or aspherical shape. The first lens 12 has a first central active portion 121 and a first peripheral inactive portion 122 extending in a radial direction from a periphery of the first central active portion 121. The second lens 13 has a second central active portion 131 and a second peripheral inactive portion 132 extending in a radial direction from a periphery of the second central active portion 131. The first central active portion 121 has a first clear aperture 1211, the second central active portion 131 has a second clear aperture 1311, and a diameter D1 of the first clear aperture 1211 is equal to a diameter D2 of the second clear aperture 1311. The first clear aperture 1211 faces to and aligns with the second clear aperture 1311, and a surface 1221 of the first peripheral inactive portion 122 faces to a surface 1321 of the second peripheral inactive portion 132, such that a flare can be avoided. A refractive index of the first lens 12 is equal to or approximately the same with that of second lens 13.

The transparent adhesive layer 14 can be made from a glue or a grease material. The transparent adhesive layer 14 is arranged between the first peripheral inactive portion 122 of the first lens 12 and the second peripheral inactive portion 132 of the second lens 13. A thickness of the transparent adhesive layer 14 can be predetermined according to a space needed between the first lens 12 and the second lens 13. A refractive index of the transparent adhesive layer 14 is approximately the same with that of the first lens 12 and that of the second lens 13, such that ghost images can be avoided.

The transparent adhesive layer 14 acts as a spacer to space apart the first and second lenses 12, 13, at the same time, the transparent adhesive layer 14 joins the first and second lenses 12, 13 into a lens group. Due to the transparent adhesive layer 14, a traditional spacer can be avoided, and the whole lens group can be more compact.

Other optical elements, such as filters (not shown) can also be arranged into the lens barrel 11. Furthermore, a retaining ring 15 can be arranged at an end of the lens barrel 11, thereby securing the lens group and other optical elements in the lens barrel 11.

The lens modules 10 can be assembled by performing the following steps in no particular order of:

1) providing the lens barrel 11, the first lens 12 and the second lens 13;

2) applying the transparent adhesive layer 14 on the surface 1221 of the first peripheral inactive portion 122 of the first lens 12;

3) placing the second lens 13, with the surface 1321 of the second peripheral inactive portion 132 thereof on the transparent adhesive layer 14 thereby forming a lens group;

4) disposing the lens group into the lens barrel 11; and 5) disposing other optical elements and the retaining ring 15 into the lens barrel 11.

Figure 3:
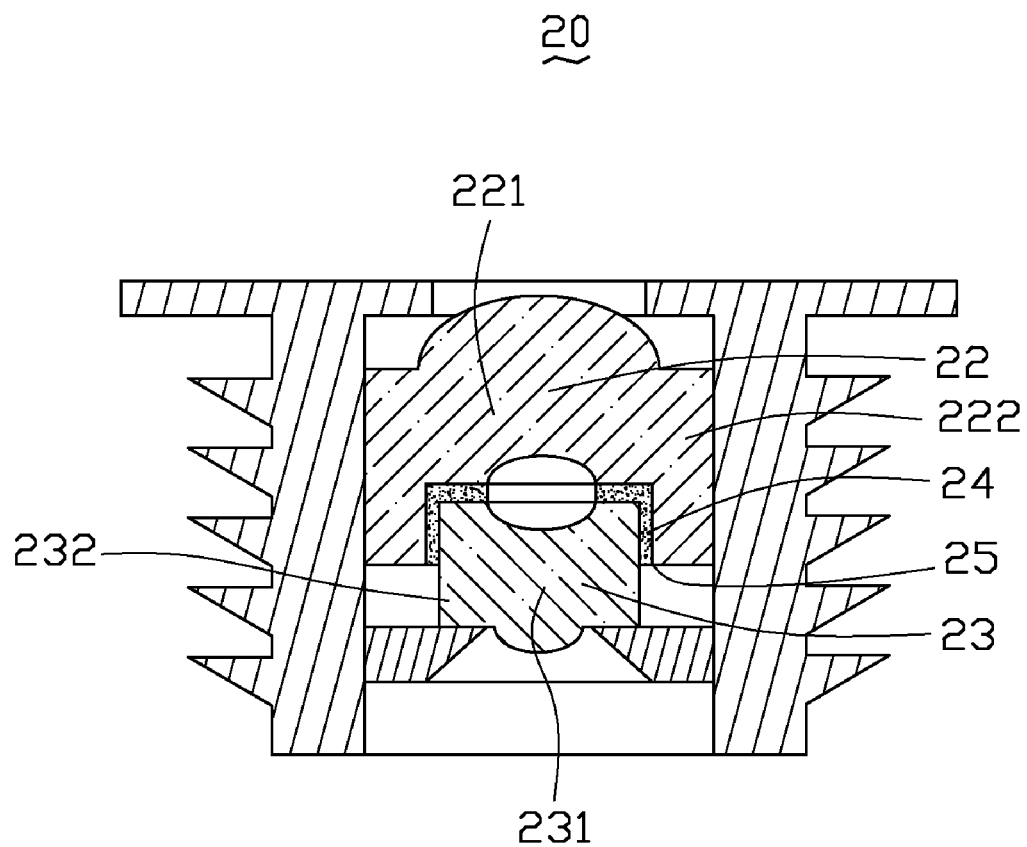
FIG. 3 is schematic view of a lens module according to a second embodiment of the present invention.

Referring to FIG. 3, an exemplary lens module 20 according to a second embodiment is shown. The lens module 20 is essentially the same as the lens module 10. However, the lens module 20 includes a first lens 22 and a second lens 23. In the first lens 22, a first peripheral inactive portion 222 thereof first extends in a radial direction from a periphery of a first central active portion 221 thereof, and then extends in a direction of an optical axis of the first central active portion 221, such that a space 25 is formed therein. In the second lens 23, a second peripheral inactive portion 232 thereof extends in a radial direction from a periphery of a second central active portion 231 thereof. An outer diameter of the second peripheral inactive portion 232 of the second lens 23 is smaller than an inner diameter of the space 25 of the first peripheral inactive portion 221 of the first lens 22, and the second lens 23 can be received in the space 25 of the first lens 22. A transparent adhesive layer 24 is applied on the inner wall of the space 25 and configured for spacing and joining the first lens 22 and the second lens 23.

The lens modules 10, 20 each can be cooperated with an image sensor (not shown) to become a camera module or to be used in varies of electronic devices.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
    a lens barrel;
    a first and a second lens received in the lens barrel, the first lens having a first central active portion congruent with a clear aperture thereof and a first peripheral inactive portion surrounding the first central active portion, the second lens having a second central active portion congruent with a clear aperture thereof and a second peripheral inactive portion surrounding the second central active portion, and the clear aperture of the first lens being equal to and in alignment with that of the second lens; and
    a transparent adhesive layer arranged between the first and second lenses in a manner such that the transparent adhesive layer spaces and joins the first and second lenses, the transparent adhesive layer being applied between the first peripheral inactive portion of the first lens and the second peripheral inactive portion of the second lens.

2. The lens module as described in claim 1, wherein the first and second peripheral inactive portions each extend in a radial direction from a periphery of the respective first and second central active portions.

3. The lens module as described in claim 1, wherein the first peripheral inactive portion first extends in a radial direction from a periphery of the first central active portion and then extends in a direction of an optical axis of the first central active portion, such that a space is formed therein, the second peripheral inactive portion extends in a radial direction from a periphery of the second central active portion, an outer diameter of the second peripheral inactive portion being smaller than an inner diameter of the space of the first peripheral inactive portion.

4. The lens module as described in claim 1, wherein refractive indexes of the first lens, the second lens and the transparent adhesive layer are approximately the same.

5. A method for assembling a lens module, the method comprising steps of:
    providing a lens barrel, a first lens and a second lens, the first lens having a first central active portion congruent with a clear aperture thereof and a first peripheral inactive portion surrounding the first central active portion, the second lens having a second central active portion congruent with a clear aperture thereof and a second peripheral inactive portion surrounding the second central active portion, and the clear aperture of the first lens being equal to that of the second lens;
    applying a transparent adhesive layer on a surface of the first lens corresponding to the first peripheral inactive portion;
    placing the second lens on the transparent adhesive layer with the transparent adhesive layer being applied between the first peripheral inactive portion of the first lens and the second peripheral inactive portion of the second lens and aligning the clear aperture of the first lens with that of the second lens thereby forming a lens group; and
    disposing the lens group into the lens barrel.

6. The method as described in claim 5, wherein the first and second peripheral inactive portions each extend in a radial direction from a periphery of the respective first and second central active portions.

7. The method as described in claim 5, wherein the first peripheral inactive portion first extends in a radial direction from a periphery of the first central active portion and then extends in a direction of an optical axis of the first central active portion, such that a space is formed therein, the second peripheral inactive portion extends in a radial direction from a periphery of the second central active portion, an outer diameter of the second peripheral inactive portion being smaller than an inner diameter of the space of the first peripheral inactive portion.

8. The method as described in claim 5, wherein refractive indexes of the first lens, the second lens and the transparent adhesive layer are approximately the same.

* * * * *